(12) United States Patent
Kim (10) Patent No.: US 11,662,725 B2
(45) Date of Patent: May 30, 2023

(54) CONTROL METHOD OF DETERMINING VIRTUAL VEHICLE BOUNDARY AND VEHICLE PROVIDING THE CONTROL METHOD

(71) Applicant: MANDO CORPORATION, Pyeongtaek-si (KR)

(72) Inventor: Woo Young Kim, Hwaseong-si (KR)

(73) Assignee: HL Klemove Corp., Incheon (KR)

(*) Notice: Subject to any disclaimer, the term of this patent is extended or adjusted under 35 U.S.C. 154(b) by 518 days.

(21) Appl. No.: 16/717,396

(22) Filed: Dec. 17, 2019

(65) Prior Publication Data
US 2020/0133274 A1    Apr. 30, 2020

(30) Foreign Application Priority Data
Oct. 17, 2018  (KR) .................. 10-2018-0123617

(51) Int. Cl.
| | |
|---|---|
| *G05D 1/00* | (2006.01) |
| *G01S 13/89* | (2006.01) |
| *G05D 1/02* | (2020.01) |
| *G01S 17/89* | (2020.01) |

(52) U.S. Cl.
CPC ............ *G05D 1/0088* (2013.01); *G01S 13/89* (2013.01); *G01S 17/89* (2013.01); *G05D 1/0212* (2013.01); *G05D 2201/0213* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,595,176 | B1* | 3/2020 | Gallagher | G08G 1/163 |
| 2019/0061752 | A1* | 2/2019 | Wang | G06V 20/58 |
| 2019/0095722 | A1* | 3/2019 | Kang | G08G 1/167 |
| 2020/0049513 | A1* | 2/2020 | Ma | G01C 21/32 |

* cited by examiner

*Primary Examiner* — Peter D Nolan
*Assistant Examiner* — Mikko Okechukwu Obioha
(74) *Attorney, Agent, or Firm* — Morgan, Lewis & Bockius LLP (57) ABSTRACT

Provided is an electronic device including: a sensing device selected from a group including a radar and a lidar and installed in a vehicle to have a sensing zone directed to outside of the vehicle, the sensing device configured to obtain sensing data about an object; an image obtainer installed in the vehicle to have a field of view directed to the outside of the vehicle, the sensing device configured to obtain image data; and a controller including at least one processor configured to process the sensing data obtained by the sensing device and the image data obtained by the image obtainer, wherein the controller generates a first virtual driving path and a second virtual driving path based on the sensing data and the image data, and when a first boundary of the first virtual driving path and a second boundary of the second virtual driving path are located at different positions, provides a virtual driving path having a boundary closest to the vehicle between the first virtual driving path and the second virtual driving path as an actual driving path.

15 Claims, 11 Drawing Sheets

CONTROL METHOD OF DETERMINING VIRTUAL VEHICLE BOUNDARY AND VEHICLE PROVIDING THE CONTROL METHOD

CROSS-REFERENCE TO RELATED APPLICATION(S)

This application is based on and claims priority under 35 U.S.C. § 119 to Korean Patent Application No. 10-2018-0123617, filed on Oct. 17, 2018 in the Korean Intellectual Property Office, the disclosure of which is incorporated by reference in its entirety.

TECHNICAL FIELD

The disclosure relates to a control method of determining a boundary of a virtual driving path for guiding an autonomous vehicle, and a vehicle in which the control method is implemented.

BACKGROUND

With the development of a vehicle technology, it is expected that the prevalence of autonomous vehicles that can drive on their own without a driver's operation will increase rapidly.

In the autonomous vehicles, it is very important to monitor lane lines, surrounding vehicles, and surrounding obstacles in real time to maintain a driving path. To this end, the vehicle is equipped with a sensor and sets a boundary of the driving path based on the lane lines or surrounding obstacles detected by the sensor.

Meanwhile, in a complicated road environment, there are various variables in which autonomous vehicles do not recognize lane lines. For example, the lane line may be blocked by a foreign object such as snow on the road surface and the sensor may not recognize the lane. The disclosure is designed to stably generate an autonomous driving path even in such a situation.

SUMMARY

Therefore, it is an aspect of the disclosure to provide a control method capable of generating a virtual boundary in which an autonomous vehicle can drive on a correct path even in a situation where it is difficult to generate an autonomous driving path due to a complicated road environment, and a vehicle providing the control method.

Additional aspects of the disclosure will be set forth in part in the description which follows and, in part, will be obvious from the description, or may be learned by practice of the disclosure.

In accordance with an aspect of the disclosure, an electronic device includes a sensing device selected from a group including a radar and a rider and installed in a vehicle to have a sensing zone facing the outside of the vehicle, configured to obtain sensing data about an object; an image obtainer installed in the vehicle to have a view toward the outside of the vehicle, configured to obtain image data; and a controller including at least one processor configured to process the sensing data obtained by the sensing device and the image data obtained by the image obtainer. The controller may be configured to generate a first virtual driving path and a second virtual driving path based on the sensing data and the image data. A first boundary of the first virtual driving path and a second boundary of the second virtual driving path are at different positions. The controller may provide a virtual driving path having a boundary closest to the vehicle among the first virtual driving path and the second virtual driving path as an actual driving path.

The sensing device may obtain distance data related to a distance between the vehicle and the object.

The controller may determine a boundary of at least one of the first virtual driving path and the second virtual driving path based on two lane lines adjacent to the vehicle.

The controller may determine a boundary of at least one of the first virtual driving path and the second virtual driving path based on a lane line adjacent to the vehicle and an object opposite to the lane.

The controller may determine a boundary of at least one of the first virtual driving path and the second virtual driving path based on a preset value.

The electronic device according to another embodiment may further include a position information obtainer configured to obtain position data including a position of the vehicle and map information of the position of the vehicle.

The controller may provide an actual driving path when the boundary of the actual driving path is inside the boundary of the third virtual driving path as a result of comparing the third virtual driving path based on the position data with the actual driving path The position data may include the third virtual driving path generated based on data received from a vehicle-to-everything (V2X) server.

In accordance with another aspect of the disclosure, a method of providing a driving path includes obtaining sensing data about an object in a sensing zone facing an outside of a vehicle; obtaining image data obtained by capturing a viewing zone facing the outside of the vehicle; and generating a first virtual driving path and a second virtual driving path based on the sensing data and the image data and providing a virtual driving path having a boundary closest to the vehicle among the first virtual driving path and the second virtual driving path as an actual driving path. A first boundary of the first virtual driving path and a second boundary of the second virtual driving path are at different positions.

The obtaining of the sensing data about the object in the sensing zone facing the outside of the vehicle may include obtaining distance data about a distance between the vehicle and the object.

The obtaining of the image data capturing the view zone facing the outside of the vehicle may include determining a type of the object using the image data.

The generating of the first virtual driving path and the second virtual driving path based on the sensing data and the image data may include determining a boundary of at least one of the first virtual driving path and the second virtual driving path based on two lane lines adjacent to the vehicle.

The generating of the first virtual driving path and the second virtual driving path based on the sensing data and the image data may include determining a boundary of at least one of the first virtual driving path and the second virtual driving path based on a lane line adjacent to the vehicle and an object opposite to the lane.

The generating of the first virtual driving path and the second virtual driving path based on the sensing data and the image data may include determining a boundary of at least one of the first virtual driving path and the second virtual driving path based on a preset value.

The providing of the virtual driving path as the actual driving path may include receiving position data of the vehicle; and when the boundary of the actual driving path is inside the boundary of the third virtual driving path as a result of comparing the third virtual driving path based on the position data with the actual driving path, providing the actual driving path.

The position data may include the third virtual driving path generated based on data received from a vehicle-to-everything (V2X) server.

In accordance with another aspect of the disclosure, a vehicle includes a sensing device selected from a group including a radar and a rider and installed in a vehicle to have a sensing zone facing the outside of the vehicle, configured to obtain sensing data about an object; an image obtainer installed in the vehicle to have a view toward the outside of the vehicle, configured to obtain image data; and a controller including at least one processor configured to process the sensing data obtained by the sensing device and the image data obtained by the image obtainer. The controller may be configured to generate a first virtual driving path and a second virtual driving path based on the sensing data and the image data. A first boundary of the first virtual driving path and a second boundary of the second virtual driving path are at different positions. The controller may provide a virtual driving path having a boundary closest to the vehicle among the first virtual driving path and the second virtual driving path as an actual driving path.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals refer to like elements throughout the specification. Not all elements of exemplary embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. The terms may refer to an electrical circuit, and may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, the embodiments of a vehicle and a method of controlling the vehicle will be described with reference to the accompanying drawings.

Hereinafter, with reference to the accompanying drawings will be described in detail an embodiment of a vehicle and a control method according to an aspect.

Figure 1:
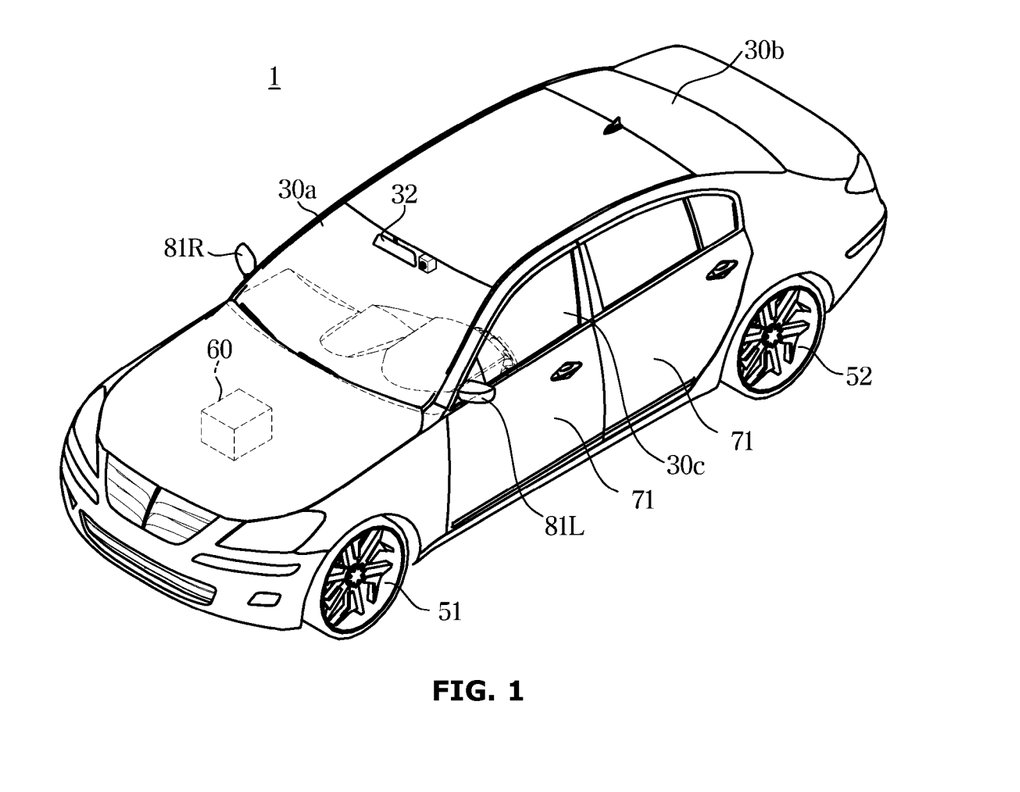
FIG. 1 is an external view of a vehicle according to an embodiment of the disclosure.
Figure 2:
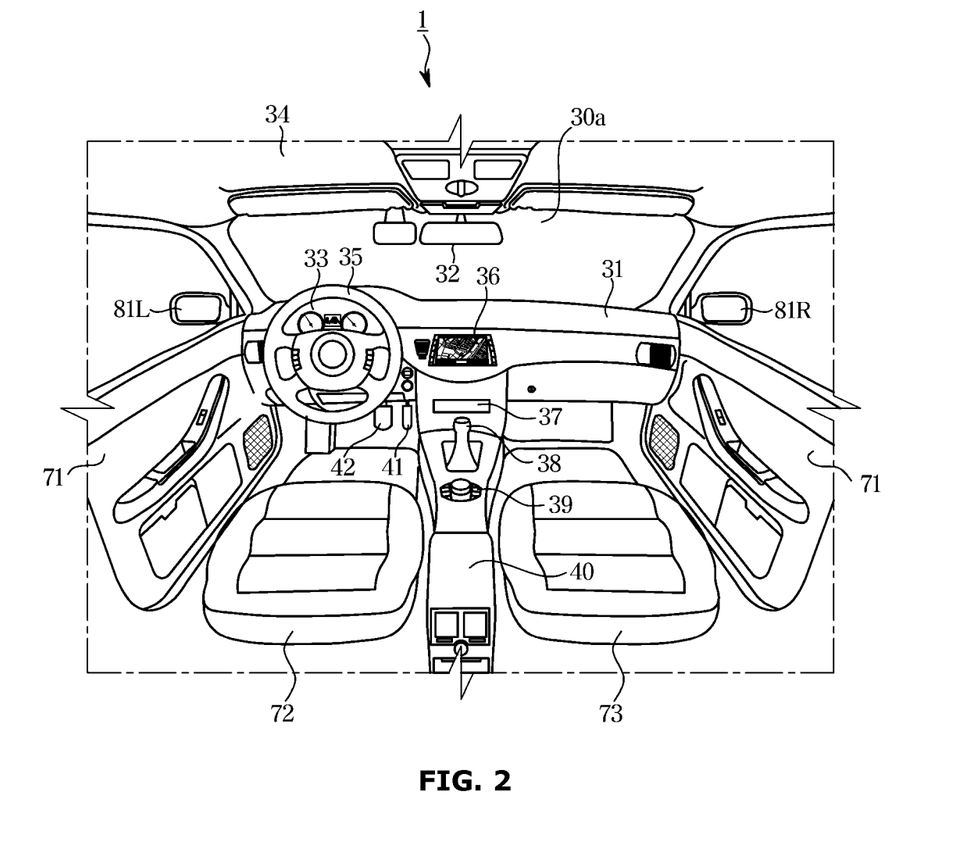
FIG. 2 is a view illustrating an interior of a vehicle according to an embodiment of the disclosure.

FIG. 1 is an exterior view of a vehicle according to an embodiment, and FIG. 2 is a view illustrating an interior of a vehicle according to an embodiment.

Referring to FIG. 1, a vehicle 1 according to an embodiment may include wheels 51 and 52 for moving the vehicle 1, a door 71 for shielding the inside of the vehicle 1 from the outside, and a vehicle 1 for the driver, front window 30*a* providing forward view, rear window 30*b* giving the driver a view behind the vehicle 1, side mirrors 81L and 81R providing the driver a view behind the vehicle 1 side. The side mirror may include a right side mirror 81R providing a right rear view and a left side mirror 81L providing a left rear view. The interior of the vehicle 1 may be provided with a room mirror 32 to provide a rear view to the driver. In addition, a side window 30*c* may be provided at an upper side of the door 71 to provide a side view.

In addition, the driving device 60 provided inside the vehicle 1 provides a rotational force to the front wheel 51 or the rear wheel 52 so that the vehicle 1 moves.

When the vehicle 1 is a front wheel drive type, the driving device 60 provides a rotational force to the front wheels 51, and when the vehicle 1 is a rear wheel type drive type, the driving force is provided to the rear wheels 52. In addition, when the vehicle 1 is a four-wheel drive system, it is possible to provide rotational force to both the front wheel 51 and the rear wheel 52.

The driving device 60 may employ a motor that generates rotational force by receiving power from an engine or a capacitor that burns fossil fuel and generates rotational force, or it is also possible to employ a hybrid method in which both an engine and a motor are provided and selectively used.

The driving device 60 may be controlled by a processor provided in the vehicle 1. The processor generates an autonomous driving path based on information provided by various sensors and communicator provided in the vehicle 1, and the driving device 60 may be controlled according to the generated autonomous driving path. On the other hand, a specific process for generating the autonomous driving path will be described in detail below.

In addition, the vehicle 1 includes a proximity sensor for detecting obstacles or other vehicles around the vehicle, a rain sensor for detecting precipitation and precipitation, an RPM sensor for detecting RPM, a position sensor for detecting a current position of the vehicle by receiving a GPS signal, or a sensing device such as a speed sensor for detecting the state of movement of the vehicle.

In addition, the proximity sensor may include a radar sensor and a lidar sensor, and each of the proximity sensors may be provided in plural in the vehicle 1. In addition, it is noted that the position and number of the radar sensor and the lidar sensor are not limited to a specific number.

The radar sensor refers to a sensing sensor that irradiates electromagnetic waves (e.g., radio waves, microwaves, etc.) to an object and receives an electromagnetic wave reflected from the object to know the distance, direction, altitude, and speed of the object. The radar sensor may include a radar antenna for transmitting electromagnetic waves or receiving electromagnetic waves reflected from an object.

The lidar sensor detects the distance, direction, altitude, speed, etc. of the object by irradiating a laser having a wavelength shorter than electromagnetic waves (for example, infrared rays, visible light, etc.) and receiving light reflected from the object. The lidar sensor may include a light source for transmitting a laser and a receiver for receiving reflected light. These lidar sensors have higher orientation resolution and distance resolution than radar sensors.

Referring to FIG. 2, a driver's seat 72, an auxiliary seat 73, a dash board 31, a steering heel 35, and an instrument panel 33 are provided inside the vehicle 1.

In addition, the vehicle 1 may include an accelerator pedal 41 pressurized by the driver in accordance with the driver's acceleration will and a brake pedal 42 pressurized by the driver in accordance with the driver's braking intention.

The dash board 31 means a panel in which the interior of the vehicle 1 and the engine room are partitioned and various components necessary for driving are installed. The dash board 31 is provided in the front direction of the driver's seat 72 and the auxiliary seat 73.

A speaker 250 may be installed in the door 71 of the vehicle 1. However, although the speaker 250 is illustrated as being provided in the door 71 of the vehicle 1, the location where the speaker 250 is provided is not limited.

The display 36 may be installed on the upper panel of the dash board 31. The display 36 may provide various pieces of information in an image to a driver or a passenger of the vehicle 1. For example, the display 36 may visually provide various information such as maps, weather, news, various moving images and still images, various types of information related to the state or operation of the vehicle 1, for example, information about an air conditioning apparatus.

The display 36 may be implemented using a navigation device that is commonly used. According to an embodiment, the display 120 may be implemented as a liquid crystal display (LCD), a light emitting diode (LED), a plasma display panel (PDP), an organic light emitting diode (OLED), a cathode ray tube (CRT), or the like, but is not limited thereto.

The display 36 may be installed in the housing integrally formed with the dash board 31 so that only the display panel is exposed to the outside. In addition, the display 36 may be installed in various locations that can be considered by the designer.

Various types of devices, such as a processor, a communicator, a satellite navigation apparatus reception module, a storage, and the like, may be installed inside the dashboard 31. The processor installed in the vehicle may be provided to control various electronic devices installed in the vehicle 1, and may be provided to perform a function of the controller 250 described later. The above-described devices may be implemented using various components such as semiconductor chips, switches, integrated circuits, resistors, volatile or nonvolatile memories, or printed circuit boards.

Meanwhile, the center console 37 may be provided with a jog shuttle type or a hard key type center input. The center console 37 means a portion where the gear operating lever 38 and the tray 40 are formed between the driver's seat 72 and the passenger seat 73.

The steering wheel 35 and the instrument panel 33 are provided in the driver's seat direction of the dash board 31.

The steering wheel 35 is rotatably provided in a predetermined direction according to the driver's operation, and the front wheel 51 or the rear wheel 52 of the vehicle 1 rotates according to the rotation direction of the steering wheel 35 so that the vehicle 1 can be steered. The steering wheel 35 may have a circular shape for the convenience of the driver, but the shape of the steering wheel 35 is not limited thereto.

The instrument panel 33 may provide the driver with various pieces of information related to the vehicle, such as the speed of the vehicle 1, the engine speed, the remaining fuel amount, the temperature of the engine oil, the blinking of the direction indicator light, and the vehicle travel distance. The instrument panel 33 may be implemented using a lamp or a scale plate, and may be implemented using a display panel according to an embodiment. When the instrument panel 33 is implemented using the display panel, the instrument panel 33 may display more various information such as fuel efficiency, performance of various functions mounted on the vehicle 1, and the like, in addition to the above-described information, to provide the driver with more various information.

Figure 3:
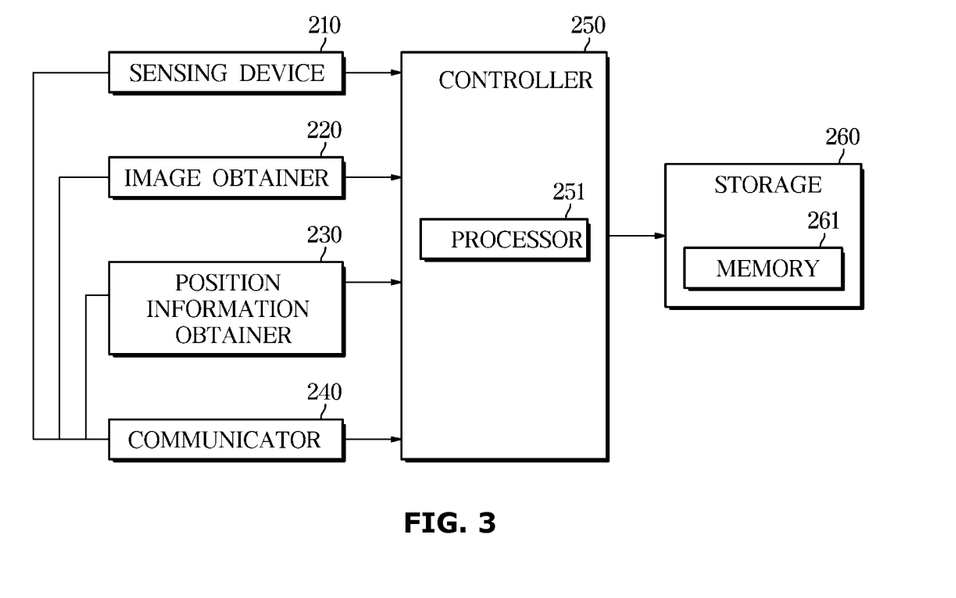
FIG. 3 is a control block diagram of a vehicle according to an embodiment of the disclosure.

FIG. 3 is a control block diagram of a vehicle according to an exemplary embodiment. Hereinafter, the configuration and operation of the vehicle 1 according to the present embodiment will be described in detail with reference to the configuration of the vehicle 1 and the control block diagram of FIG. 3.

On the other hand, before describing the configuration and operation of the vehicle 1, the terms used in the present specification will be described.

In the present specification, the virtual driving path refers to data about a driving guide required for autonomous driving of a vehicle. At this time, the vehicle needs to establish a virtual driving lane line in order to determine the virtual driving path. The driving lane line may be determined according to a boundary determined on the left side and right side with respect to the vehicle. Therefore, when the virtual driving path is determined, the vehicle travels along the virtual driving path so as not to deviate from the boundary defined left and right.

Referring to FIG. 3, a vehicle 1 according to an embodiment includes a sensing device 210 for detecting an object around a vehicle, an image obtainer 220 for acquiring an image of the surrounding of the vehicle 1, a position information obtainer 230 which provides geographic information about where the vehicle 1 is located, a sensing device 210, an image obtainer 220, and a communicator 240 to transmit and receive information between the position information obtainer 230, a controller 250 for generating a virtual driving path based on the sensor information acquired by the sensing device 210 and the image information obtained by the image obtainer 220, and a storage 260 capable of storing the generated virtual driving path.

The sensing device 210 includes various sensors provided in the vehicle 1 to detect an object present in the vicinity of the vehicle 1 and to detect the object. For example, the sensing device 210 may include a lidar sensor, a radar sensor, an illuminance sensor, a rain sensor, and a distance sensor. The sensing device 210 may process information about the existence and distance of an object and transmit the processed information to the controller 250.

In addition, the sensing device 210 may include a radar sensor and a lidar sensor, and may acquire various pieces of information about an object sensed in a sensing zone directed to the outside of the vehicle. The sensing device 210 may provide the controller 250 with sensing data including various pieces of information about the object.

The object may be detected by the sensing device 210 as a lane line, an obstacle, or the like outside the vehicle, and refers to an object that is a reference for setting a boundary in generating a virtual driving path. For example, the object may be a lane line adjacent to the left and right of the vehicle. In this case, the left and right boundaries of the virtual driving path may be determined based on the detected lane line.

The image obtainer 220 may include an image sensor, an image processing module, and the like provided in the vehicle 1 to acquire an image around the vehicle. The image obtainer 220 may process a still image or a moving image obtained by an image sensor (e.g., CMOS or CCD). The image obtainer 220 may process the still image or the moving image obtained through the image sensor, extract necessary information, and transfer the image data to the controller 250. The image obtainer 220 may provide a process of generating a virtual driving path by detecting a lane line or a road edge based on the acquired image information.

The position information obtainer 230 is a module for supporting a vehicle-to-vehicle (V2V), a vehicle-to-infra (V2I), and a vehicle-to-mobile communication (V2N), and may be embedded in or provided outside the vehicle 1. In addition, the position information obtainer 230 is a module for communication with the vehicle 1, using communication techniques defined by a standardization organization, and may support vehicle-to-vehicle communication (V2V), vehicle-to-infrastructure communication (V2I), and vehicle-to-mobile communication (V2N).

In addition, the position information obtainer 230 may include a module for obtaining the position of the vehicle 1. One example of the position information object 230 may be a Global Positioning System (GPS) module. For example, when the position information obtainer 230 is implemented using a GPS module, the position of the vehicle may be acquired using a signal transmitted from a GPS satellite.

Meanwhile, the V2X server, which may be connected to the position information obtainer 230 may acquire various types of information, such as real-time traffic conditions, road conditions, traffic path control conditions, and the like, on the basis of sensor information input through the sensing device 210, image information input through the image obtainer 220, and communication (i.e., V2I communication) data transmitted to and received from the vehicle 1 travelling on the road. In addition, the position information obtainer 230 may transmit a map, a traffic signal system, traffic information, notification information, and various types of service information provided from the V2X server to V2X devices of vehicles and pedestrians existing within the communication coverage of the position information obtainer 230.

The communicator 240 may enable communication between the sensing device 210, the image obtainer 220, and the position information obtainer 230 described above.

The controller 250 may include at least one processor 251. The controller 251 may generate a virtual driving path, which will be described later, using data acquired from the sensing device 210, the image obtainer 220, and the position information obtainer 230 through the processor 251.

The controller 250 generates a virtual driving path for guiding autonomous driving of the vehicle based on the information obtained by the sensing device 210, the image obtainer 220, or the position information obtainer 230. The controller 250 may generate a plurality of virtual driving paths based on various pieces of information. For example, the controller 250 may determine a boundary of a virtual driving path based on the information about a lane line on the road obtained by the sensing device 210 or the image obtainer 220, and may determine the boundary of the virtual driving path based on an obstacle adjacent to the vehicle.

Meanwhile, the controller 250 may provide the generated virtual driving path as data for autonomous driving, or may provide the most suitable virtual driving path among a plurality of virtual driving paths as data for autonomous driving. Detailed description thereof will be described in detail with reference to FIGS. 4, 5, 6, 7 and 8.

The storage 260 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage unit 130 is not limited thereto.

In the above, the configuration and the operation of the vehicle 1 according to the embodiment of the present disclosure have been described. In the following, the control method performed by the vehicle 1 will be described in detail.

Figure 4:
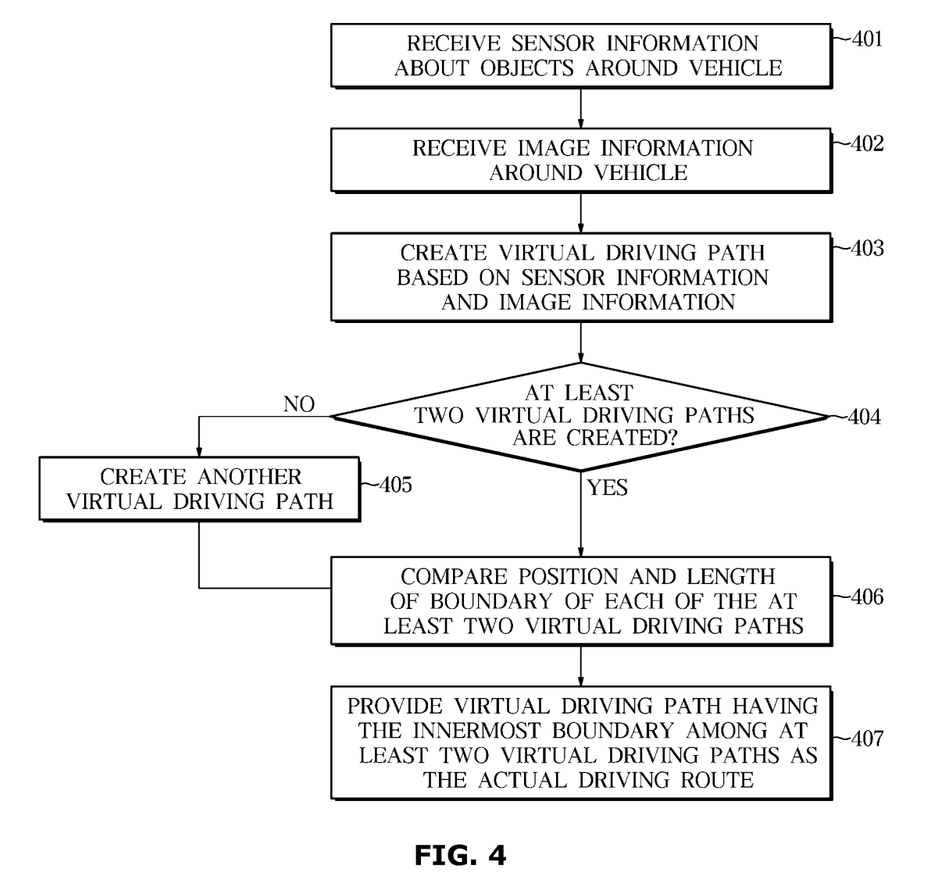
FIG. 4 is a flowchart illustrating a driving path providing method according to an embodiment of the disclosure.

FIG. 4 is a flowchart showing a method of providing an autonomous driving path according to an embodiment of the present disclosure. However, this is only a preferred embodiment for achieving the object of the present disclosure, and some operations may be added or deleted as needed. In addition, it should be noted that the agent of performing each operation may be omitted for the sake of convenience in description.

Sensor information about an object around a vehicle is received (401). The object refers to an object existing outside the vehicle and detected by a sensing device provided in a vehicle, for example, a lane line or an obstacle. The sensor information refers to a factor that may be detected by the sensor to be used for determining the boundary of the virtual driving path. For example, the sensor information may include information about a distance between the vehicle and a lane line or an obstacle adjacent to the vehicle.

Image information of the surroundings of the vehicle is received (402). The image information includes information obtained by processing an image captured by the image obtainer provided in the vehicle using image processing. For example, the image information may include identification information for classifying whether an object in a captured image is a pedestrian or an obstacle.

A virtual driving path is generated based on the sensor information and the image information (403). The virtual driving path is generated based on at least one of the sensor information and the image information. Each piece of the sensor information and the image information may be collected by the communicator 240 provided in the vehicle 1, and the boundary of the virtual driving path may be determined based on the collected information.

If at least two virtual driving paths are not generated (404), another virtual driving path is generated (405).

In a state in which at least two virtual driving paths are generated (404), the positions and lengths of the boundaries of the generated at least two virtual driving paths are compared (406). The comparison will be described in detail with reference to FIGS. 5, 6, 7 and 8.

Figure 5:
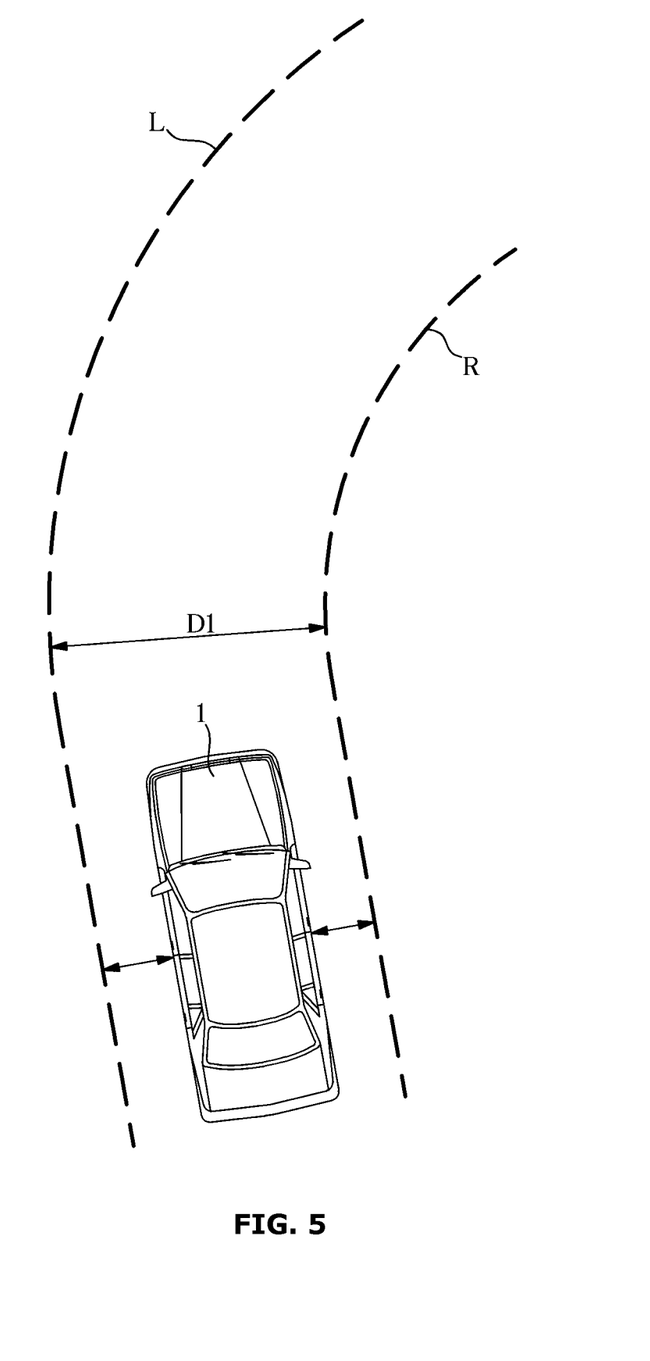
FIGS. 5, 6, 7 and 8 are views for describing a driving path providing method according to FIG. 4 in more detail.

Referring to FIG. 5, it can be seen that the virtual driving path may be generated based on a left lane L and a right lane R with respect to the vehicle 1. The vehicle 1 travels within a range between the left lane L which is the left boundary of the generated virtual driving path and the right lane R which is the right boundary of the generated virtual driving path. Meanwhile, each boundary may be determined according to a specific criterion. For example, each boundary may be based on a lane detected by a sensor provided in a vehicle. FIG. 5 illustrates an example in which the left and right boundaries are determined based on the adjacent lanes of the vehicle 1.

Figure 6:
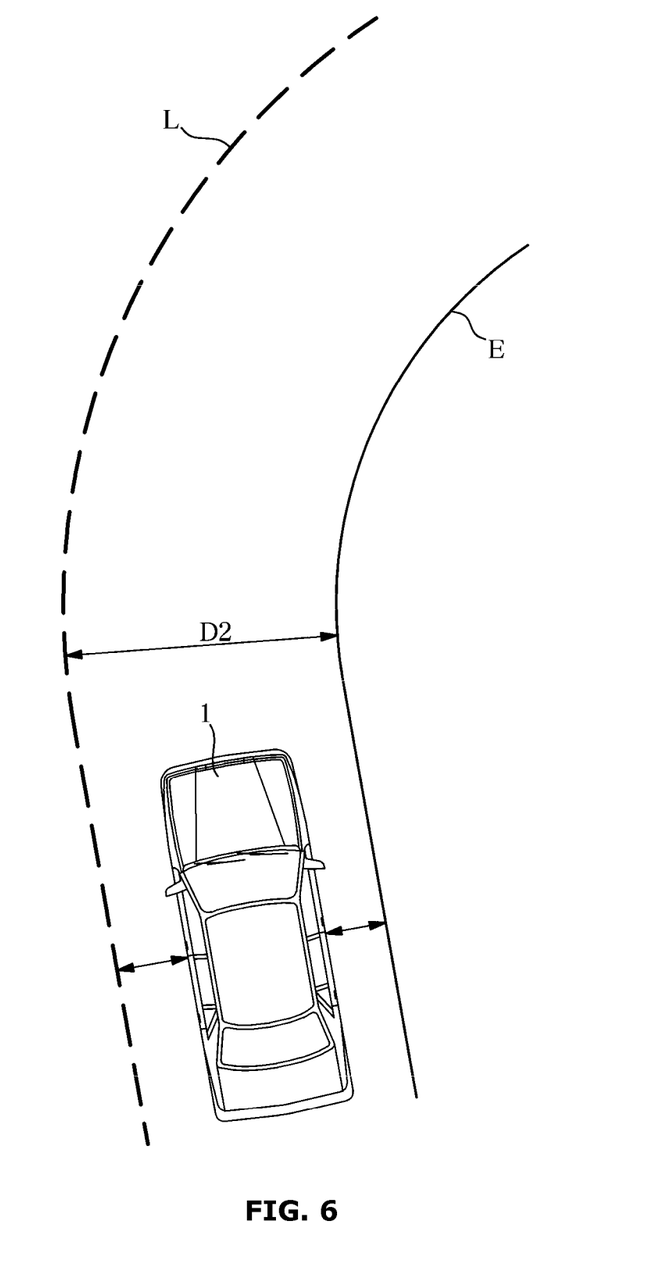

Meanwhile, referring to FIG. 6, it can be seen that the virtual driving path is generated by having the left lane L and the right road edge E as the boundaries. The method of determining the left boundary is identical to that described with reference to FIG. 5, but unlike FIG. 5, the right boundary is determined based on the road edge E. The road edge E may refer to a structure, such as a sidewalk curb detected through a sensor provided in the vehicle 1. As such, the boundary of the virtual driving path may be determined based on criteria different from that described in FIG. 5.

Figure 7:
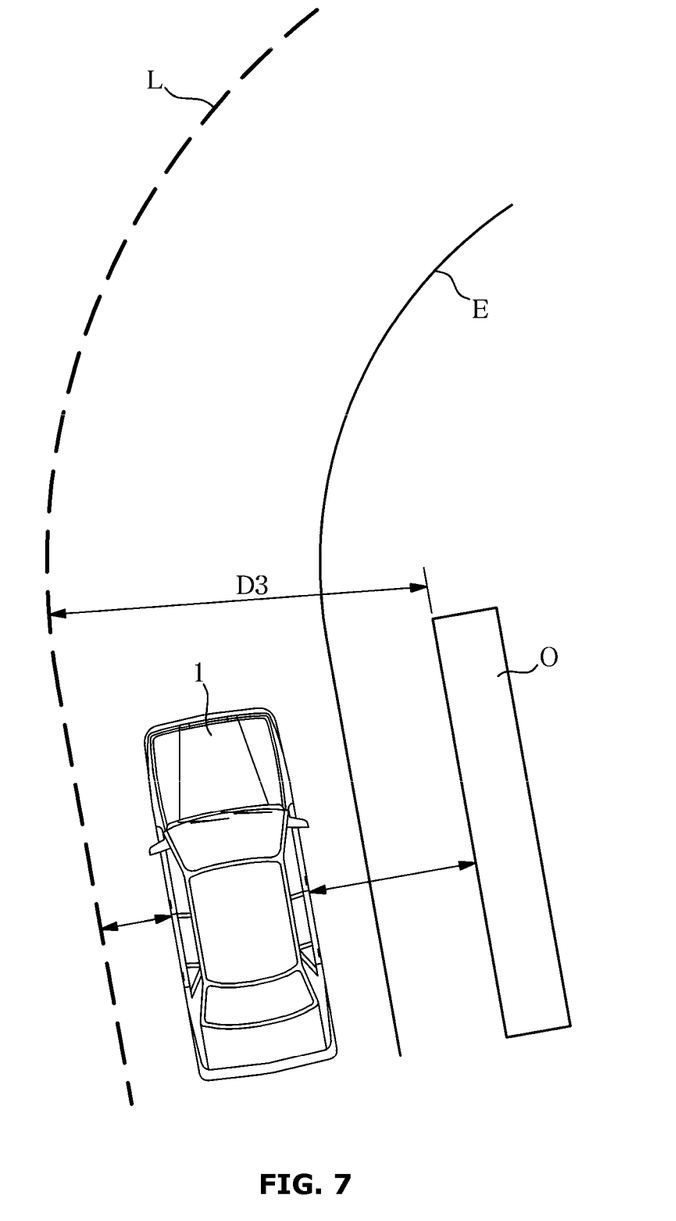

Referring to FIG. 7, the virtual driving path may be generated based on a left lane L and a right obstacle O with respect to the vehicle 1. The method of determining the left boundary is identical to those described with reference to FIGS. 5 and 6. However, unlike FIGS. 5 and 6, the right boundary is determined based on the obstacle O adjacent to the vehicle. The obstacle O refers to facilities existing outside the vehicle that may be detected by various sensors provided on the vehicle 1. For example, the obstacle O may include various objects that may be found on a road, such as a noise barrier or a tree. As such, the boundary of the virtual driving path may be determined based on criteria different from those described in FIGS. 5 and 6.

In addition, the boundary of the virtual driving path may be determined according to a lane line of an immediately previous driving lane, and may be determined according to a preset boundary width and a preset boundary position.

Figure 8:
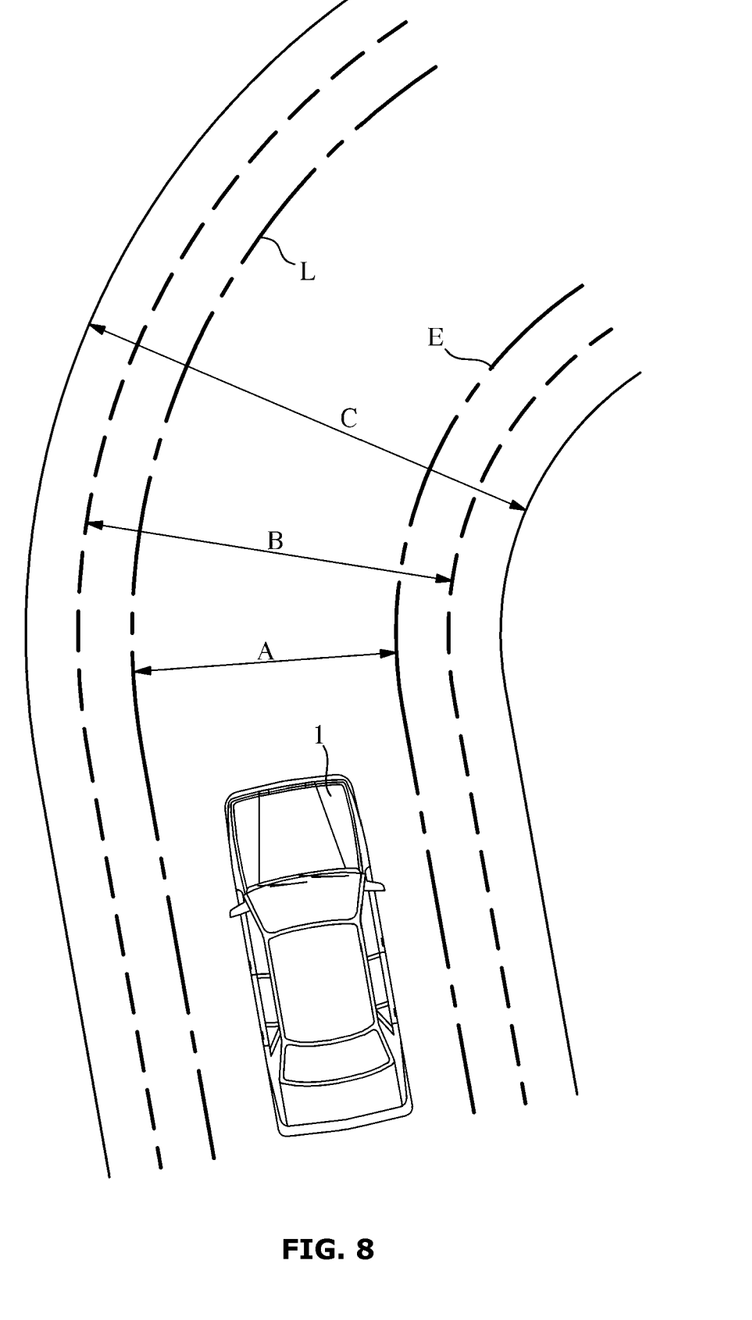

Meanwhile, as described with reference to FIGS. 5, 6 and 7, it can be seen that the virtual driving path may be generated in a plurality of units thereof as the plurality of virtual driving paths are generated according to different criteria. When the plurality of virtual driving paths is generated, the most suitable virtual driving path may be provided as an actual driving path through comparison. For example, referring to FIG. 8, the plurality of virtual driving paths includes a first boundary A, a second boundary B, and a third boundary C. The vehicle 1 travels on the basis of the width of one of the first, second and third boundaries A, B, and C, in which the vehicle 1 may be provided with a stable autonomous driving path when traveling a range between boundaries closest to the vehicle 1. Therefore, the first boundary A, the second boundary B, and the third boundary C among the plurality of virtual driving paths are compared with each other and a virtual driving path having the boundary closest to the vehicle 1 may be determined as the actual driving path. In FIG. 8, when a virtual driving path according to the first boundary A is determined as the actual driving path, a stable autonomous driving path may be provided.

According to the comparison result, the virtual driving path having the boundary closest to the vehicle among the at least two virtual driving paths is provided as the actual driving path (407). In this case, the autonomous vehicle travels along the actual driving path.

Figure 9:
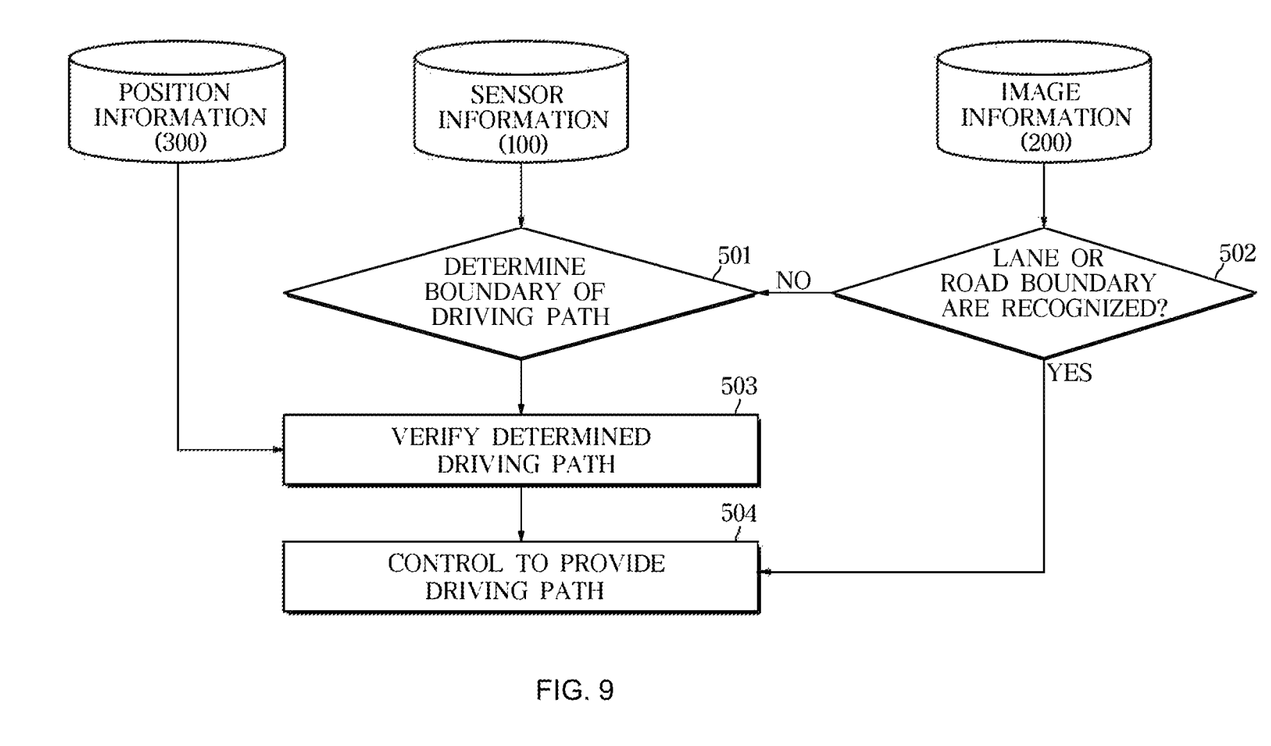
FIG. 9 is a flowchart illustrating a driving path providing method according to another embodiment of the disclosure.

FIG. 9 is a flowchart showing a method of providing an autonomous driving path according to another embodiment of the present disclosure. However, this is only a preferred embodiment for achieving the object of the present disclosure. Some operations may be added or deleted as needed. In addition, it should be noted that the agent of performing each operation may be omitted for the sake of convenience in description.

As described above, similar to the previous embodiment, the embodiment of the present disclosure also uses sensor information 100, image information 200, and position information 300 in generating a virtual driving path and providing an actual driving path.

Figure 10:
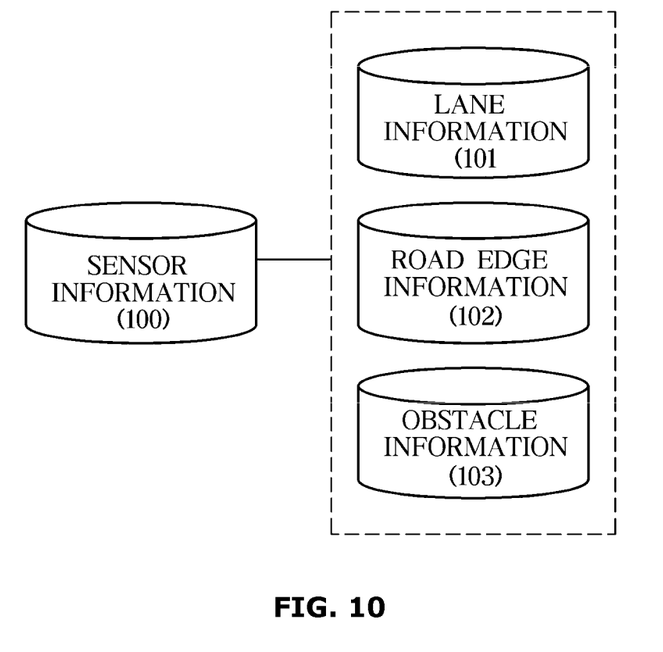
FIGS. 10 and 11 are views for describing a driving path providing method according to FIG. 9 in more detail.

First, the virtual driving path may have a boundary that is set based on the sensor information 100. Referring to FIG. 10, the sensor information 100 may include lane line information 101, road edge information 102, and obstacle information 103. In addition, the virtual driving path may have the boundary to be set by further considering the image information 200. Accordingly, even when the controller fails to recognize a lane line or a road boundary adjacent to the vehicle (502), the boundary of the virtual driving path may be set. This is to prepare for a case in which the boundary of the virtual driving path is not set only with the lane line.

Figure 11:
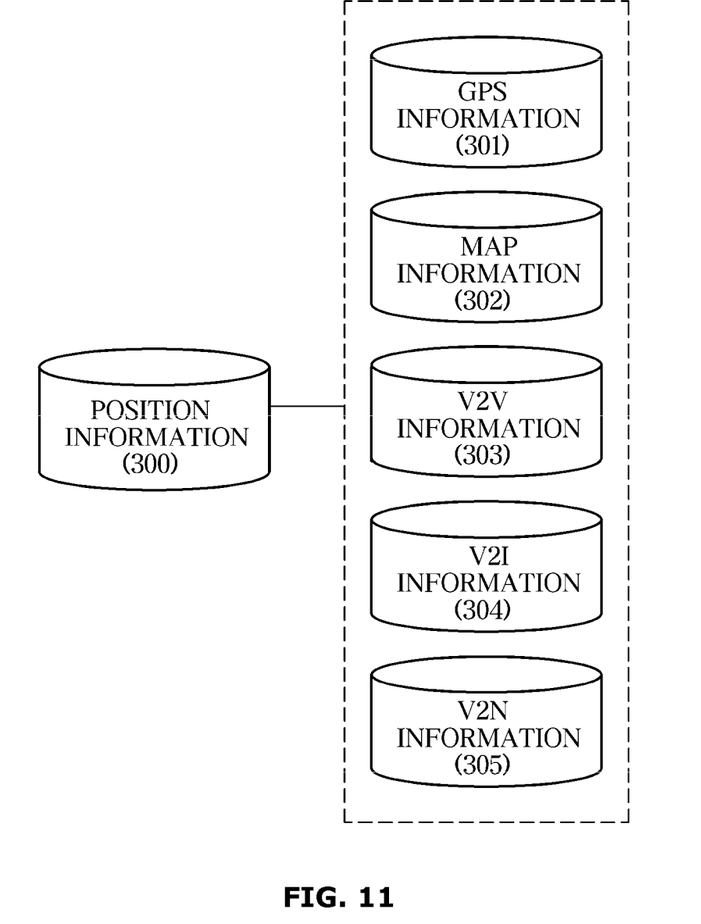

Meanwhile, the present embodiment may further include verifying the validity of the virtual driving path (503). In detail, the verifying of the validity may include verifying the validity of the virtual driving path using the position information 300. The position information 300 may include GPS information 301, map information 302, V2V information 303, V2I information 304, and V2N information 305. For example, the position information 300 may include data about an autonomous driving path provided from a V2X server obtained from the position information obtainer. The virtual driving path maybe compared with the data provided from the V2X server, so that it is verified whether the virtual driving path is a valid autonomous driving path.

Finally, when it is determined that the generated virtual driving path is valid, the virtual driving path may be provided to a vehicle that performs autonomous driving as the actual driving path.

In accordance with an aspect of the present disclosure, it is possible to provide data regarding a reliable driving path even when the lane is not visible on the actual road.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. An electronic device comprising:
  a sensing device selected from a group including a radar and a lidar and installed in a vehicle to have a sensing zone directed to outside of the vehicle, the sensing device configured to obtain sensing data about an object;
  an image sensor installed in the vehicle to have a field of view directed to the outside of the vehicle, the image sensor configured to obtain image data; and
  a controller including at least one processor configured to process the sensing data obtained by the sensing device and the image data obtained by the image sensor,
  wherein the controller generates a first virtual driving path and a second virtual driving path based on the sensing data and the image data, and when a first boundary of the first virtual driving path and a second boundary of the second virtual driving path are located at different positions, provides a virtual driving path having a boundary closest to the vehicle between the first virtual driving path and the second virtual driving path as an actual driving path,
  wherein the sensing device obtains distance data related to a distance between the vehicle and the object; and
  wherein each of the first virtual driving path and the second virtual driving path is generated corresponding to a lane where the vehicle is traveling.

2. The electronic device of claim 1, wherein the controller determines a boundary of at least one of the first virtual driving path and the second virtual driving path based on two lane lines adjacent to the vehicle.

3. The electronic device of claim 1, wherein the controller determines a boundary of at least one of the first virtual driving path and the second virtual driving path based on a lane line adjacent to the vehicle and an object opposite to the lane line.

4. The electronic device of claim 1, wherein the controller determines a boundary of at least one of the first virtual driving path and the second virtual driving path based on a preset value.

5. The electronic device of claim 1, further comprising a position information obtainer configured to obtain position data including a position of the vehicle and map information of the position of the vehicle.

6. The electronic device of claim 5, wherein the controller compares a third virtual driving path based on the position data with the actual driving path, and as a result of the comparison that a boundary of the actual driving path is provided inward of a boundary of the third virtual driving path, provides the actual driving path.

7. The electronic device of claim 6, wherein the position data includes the third virtual driving path generated based on data received from a vehicle-to-everything (V2X) server.

8. A method of providing a driving path, the method comprising:
  obtaining sensing data about an object in a sensing zone directed to an outside of a vehicle;
  obtaining image data by capturing a viewing zone directed to the outside of the vehicle; and
  generating a first virtual driving path and a second virtual driving path based on the sensing data and the image data, wherein when a first boundary of the first virtual driving path and a second boundary of the second virtual driving path are located at different positions, a virtual driving path having a boundary closest to the vehicle between the first virtual driving path and the second virtual driving path is provided as an actual driving path,
  wherein each of the first virtual driving path and the second virtual driving path is generated corresponding to a lane where the vehicle is traveling.

9. The method of claim 8, wherein the obtaining of the image data by capturing the viewing zone directed to the outside of the vehicle includes determining a type of the object using the image data.

10. The method of claim 8, wherein the generating of the first virtual driving path and the second virtual driving path based on the sensing data and the image data includes determining a boundary of at least one of the first virtual driving path and the second virtual driving path based on two lane lines adjacent to the vehicle.

11. The method of claim 8, wherein the generating of the first virtual driving path and the second virtual driving path based on the sensing data and the image data includes determining a boundary of at least one of the first virtual driving path and the second virtual driving path based on a lane line adjacent to the vehicle and an object opposite to the lane.

12. The method of claim 8, wherein the generating of the first virtual driving path and the second virtual driving path based on the sensing data and the image data includes determining a boundary of at least one of the first virtual driving path and the second virtual driving path based on a preset value.

13. The method of claim 8, wherein the providing of the virtual driving path as the actual driving path includes:
  receiving position data of the vehicle; and
  comparing a third virtual driving path based on the position data with the actual driving path, and as a result of the comparison that a boundary of the actual driving path is provided inward of a boundary of the third virtual driving path, providing the actual driving path.

14. The method of claim 13, wherein the position data includes the third virtual driving path generated based on data received from a vehicle-to-everything (V2X) server.

15. A vehicle comprising:
  a sensing device selected from a group including a radar and a lidar and installed in the vehicle to have a sensing zone directed to an outside of the vehicle, the sending device configured to obtain sensing data about an object;
  an image sensor installed in the vehicle to have a field of view directed to the outside of the vehicle, and configured to obtain image data; and
  a controller including at least one processor configured to process the sensing data obtained by the sensing device and the image data obtained by the image sensor,
  wherein the controller generates a first virtual driving path and a second virtual driving path based on the sensing data and the image data, and when a first boundary of the first virtual driving path and a second boundary of the second virtual driving path are located at different positions, provides a virtual driving path having a boundary closest to the vehicle between the first virtual driving path and the second virtual driving path as an actual driving path,
wherein the sensing device obtains distance data related to a distance between the vehicle and the object, and
wherein each of the first virtual driving path and the second virtual driving path is generated corresponding to a lane where the vehicle is traveling.

* * * * *